United States Patent [19]

Yant et al.

[11] Patent Number: 5,304,355
[45] Date of Patent: Apr. 19, 1994

[54] MIXER-REACTOR EQUIPMENT FOR TREATING FINE SOLIDS WITH GASEOUS REAGENTS

[75] Inventors: Robert E. Yant, Medina; Richard J. Galluch, Hudson; Mark E. Piechuta, Alliance, all of Ohio

[73] Assignee: Quantum Technologies Inc., Twinsburg, Ohio

[21] Appl. No.: 941,805

[22] Filed: Sep. 8, 1992

[51] Int. Cl.$^5$ .............................................. B01F 5/00
[52] U.S. Cl. ................................. 422/225; 366/327; 422/224; 422/228
[58] Field of Search ............... 422/225, 224, 228; 366/307, 302, 327, 325

[56] References Cited

U.S. PATENT DOCUMENTS

| | | | |
|---|---|---|---|
| 2,655 | 11/1861 | Mudge | 366/302 |
| 531,718 | 1/1895 | Detwiler et al. | 422/225 X |
| 918,215 | 4/1909 | Steen | 366/307 |
| 1,381,673 | 6/1921 | Sherwood | 366/307 |
| 1,415,861 | 5/1922 | Bing | 366/302 X |
| 1,870,980 | 8/1932 | Altwegg | 422/225 X |
| 2,491,656 | 12/1949 | Goldman | 366/302 X |
| 3,155,376 | 11/1964 | Möllenbruck | 366/307 X |
| 3,712,592 | 1/1973 | Heatcoat | 366/307 |
| 4,310,124 | 1/1982 | Schwing et al. | 366/307 X |
| 4,805,154 | 2/1989 | Scheider | 366/307 |

Primary Examiner—Robert J. Warden
Assistant Examiner—Krisanne M. Thornton
Attorney, Agent, or Firm—Arthur S. Collins

[57] ABSTRACT

A compact, heavy duty mixer-reactor is described which features a double-stage mixing/reaction chamber, one stage being of wall-baffled design and the other being unbaffled. Said mixer-reactor operates with a unique, two-stage impeller having a different set of coextensive agitator blades within each of said stages. For example, the effective radii of the blades in said unbaffled stage are significantly larger than those of the blades in said baffled stage. In addition, other differences in shape and pitch of the respective sets of agitator blades are provided to give enhanced performance, particularly in mixing and reacting finely divided solids with gases. The subject apparatus delivers outstanding results in terms of expediting thorough mixing and promoting complete reactions between fine solids and gaseous reagents. These results are particularly noteworthy when treating non-Newtonian suspensions of solids and liquids (e.g. wet wood pulps and the like) with virtually insoluble gaseous reagents such as ozone, oxygen or mixtures thereof, which often require superatmospheric conditions in order to achieve satisfactory treatment.

20 Claims, 2 Drawing Sheets

MIXER-REACTOR EQUIPMENT FOR TREATING FINE SOLIDS WITH GASEOUS REAGENTS

This invention is directed to apparatus for mixing and reacting finely divided solids with gases and/or liquids, and is especially suited for carrying out uniform gaseous treatments of thick suspensions or masses of particulate solids wetted with water or aqueous liquids. One major important use for the subject apparatus is in conducting controlled purification or belaching type treatments of various fibrous cellulosic materials, such as are practiced in producing paper goods and the like. Such fibrous materials are generally processed in the form of thick "pulps" or viscous suspensions which are rather difficult to mix and uniformly treat, especially with gaseous reagents.

BACKGROUND OF THE INVENTION

The most familiar form of equipment found in the art of mixing fluids and solids can best be described as that of the "stirred" vessel; i.e., a tank or mixing chamber having one or more mechanically driven agitators or impellers mounted therein. Said agitators can vary widely in type, location and method of mounting in a particular mixing chamber. However, the main mixing chamber in such equipment has most often been fabricated with a generally cylindrical shape. Stationary wall baffles are frequently mounted on the inside lateral surfaces of such cylindrical mixing chambers in order to modify the flow patterns created by the mechanically driven agitators employed therein, especially when said agitators are designed to rotate concentrically around the central axis of said cylindrical chambers.

Basic teachings regarding the effectiveness of various types and sizes of agitators and baffle systems and how they tend to interact to achieve efficient mixing are available in technical literature such as the article by E. J. Lyons in Chemical Engineering Progress 44, p. 341 et seq (1948). An important recent advance in the art of improving the performances of various types of agitators by using them with a unique system of wall baffles is disclosed in U.S. Pat. No. 4,941,752. The integrated apparatus described in this patent has proved to be especially useful in mixing and reacting pulped fibrous solids with a wide variety of fluid reagents.

SUMMARY OF THE INVENTION

A primary object of this invention is to provide improved apparatus for mixing and reacting gaseous reagents with viscous suspensions of finely divided solid material and liquid. A corollary objective is to provide such apparatus which is economical, efficient and dependable, even for handling gases, (such as air and oxygen) which at reasonable pressures are only very slightly soluble in water or the usual aqueous liquid media.

A secondary, more specialized objective is the provision of mixing equipment which is suitable for rapidly mixing various liquids and/or gases with finely divided fibrous solids, such as wood pulps, without substantially damaging the fiber strength or individual particle integrity thereof. A further objective is to devise improved methods of handling, processing and treating such a solids/liquids suspension in such equipment so as to effect chemical changes therein; e.g., bleaching and/or purification thereof. Still other objectives and advantages of our invention will be obvious or become more clear from the detailed disclosures including specific embodiments and particular methods of operation described and claimed hereinafter.

The improved mixer/reactor equipment of the present invention in its simplest form, comprises an enclosed housing having a generally cylindrical inside wall with a length to diameter ratio of at least about 0.5, and preferably between about 0.6 and about 3. The thickness of said wall, as well as those of any pressure-tight end-closures for same, are of course chosen in accordance with the range of operating pressures contemplated. At least one end closure should be readily removable while the other can be integrally connected to said housing, e.g. so as to form a rigid end piece or floor for same. Through a central opening in such a rigid end piece, a suitably sealed drive shaft extends concentrically within said cylindrical wall.

The first or lower portion of said cylindrical wall is provided with a plurality of uniform, coaxial, equally spaced, elongated baffles, whereas no wall baffles are present in the upper or second portion thereof. To complete the picture, a unique two-stage impeller with a separate set of agitator blades in each stage is mounted on the concentric drive shaft extending through said cylindrical inside wall. The blades in the first (baffled) stage differ significantly from those in the second (unbaffled) stage. For example, the blades in said second stage are of significantly larger radius so as to provide a close clearance (e.g. of the order of 1/16 to $\frac{1}{4}$ of an inch) between their outer edges and said cylindrical wall. Even, for a relatively small mixer-reactor, with about a 6" cylindrical radius, for example, this close clearance represents less than 5% of the total radius. On the other hand, the closet clearance desirable between said wall baffles and the blades in the first or lower section is normally about 10 to 20% of the cylindrical wall radius. Since a typical radial dimension for effective wall baffles is also generally of the order of 10 to 20% of the cylindrical wall radius, the outermost radius of blades in the first section is generally at least about 15% (and often as much as about 35%) less than that of the upper blades.

The relative lengths of the first (baffled) section and the second (unbaffled) section is not critical in most cases. For example, the length of the second section can conveniently vary from about 0.5 to about 5 times that of the first section but a ratio somewhere between about 0.7 and about 4 is likely to be chosen most often. The bottom edges of the first stage blades and the upper edges of the second stage blades obviously cannot reach quite all the way to their adjacent end closure pieces. However, it is preferred that the clearances therebetween be pretty close, e.g. not greater than about $\frac{1}{4}$". Also, it is strongly preferred that at least the outermost lateral edges of the blades in the respective stages be substantially coextensive with the lengths of each stage.

Although any effective system of elongated, coaxial, equally spaced wall baffles (such as simple rib or blade shapes) can be mounted in the first section of the cylindrical housing of our mixer-reactor with satisfactory results, we strongly prefer to use those having the cross-sectional shape of a geometric segment of a circle such as are described in U.S. Pat. No. 4,941,752. In view of the complete and thorough description contained therein of such baffles and their advantages, the entire disclosure of U.S. Pat. No. 4,941,752 is hereby incorporated by reference in the present application just as fully as if the text of same were bodily included herein.

Finely divided fibrous solids, such as pulped woody fibers, are especially likely to form highly thixotropic suspensions while undergoing purification and bleaching treatments; e.g., in the production of paper. Since the energy inputs required to mix such materials with the liquid and/or gaseous chemical reactants involved are unusually high, special additional benefits accrue from using the enclosed mixer/reactor of this invention which is operable under superatmospheric pressures. Thus, the thorough mixing needed to initiate uniform chemical reaction within the pulped fiber suspension can be quickly accomplished in our apparatus, using less power and with minimal physical damage to the fibers from the mechanical action generated by the impeller. Indeed, the present equipment is ideally suited for effecting uniform gaseous treatments of pulped fibers, e.g. in purifying and/or bleaching same with reagents such as $O_2$, $O_3$, $ClO_2$, etc.

DETAILED DESCRIPTION

Figure 1:
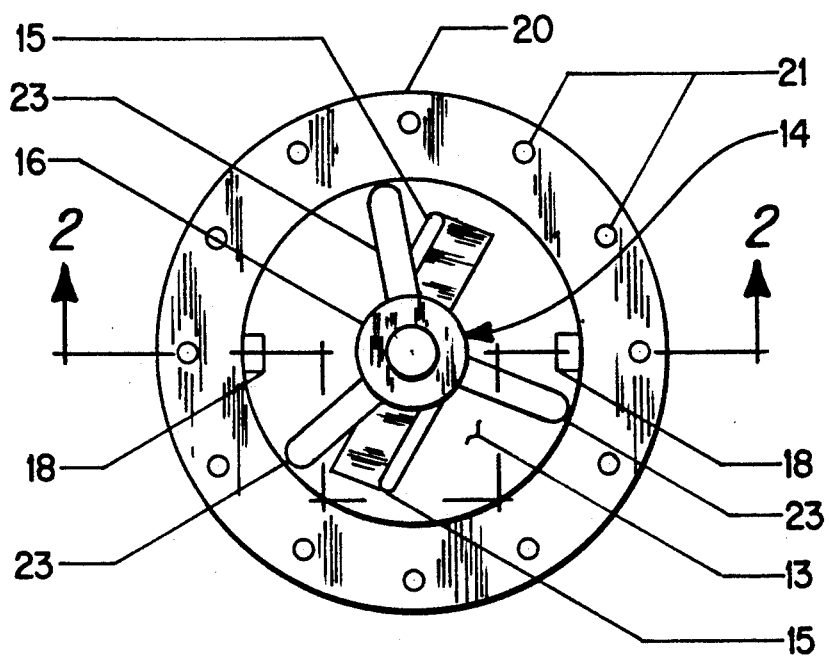
FIG. 1 is a top, plan view of a heavy duty mixer-reactor constructed in accordance with the invention.
Figure 2:
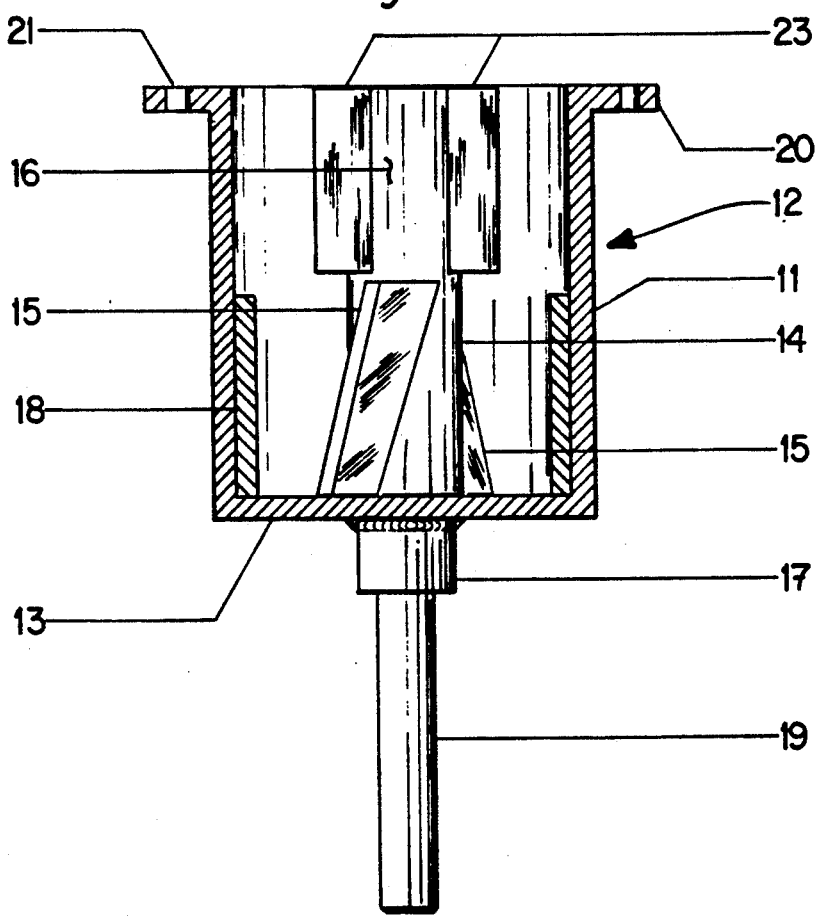
FIG. 2 is an elevational side view of the mixer-reactor of FIG. 1 taken along uneven cross-section line 2—2 thereof.

FIGS. 1 and 2 exemplify a compact, heavy-duty, mixer-reactor designed for pressurized service. In this embodiment, the main housing 12 has a height slightly greater than its internal diameter and a thick cylindrical side wall 11 joined continuously at the bottom to an equally strong floor 13. Likewise, the side wall 11 is provided at the top with an integral flange ring 20, having suitable bolt holes 21, via which a matching lid closure (not shown) can be removably attached. Optionally, side wall 11 can also be provided with means (not shown) for supplying heat thereto; e.g., in such known fashions as via electrical heating bands or an annular jacket for hot fluid.

As best seen in FIG. 2, a sturdy concentric drive shaft 19 extends coaxially through the cylindrical interior of sidewall 11 via a hole in floor 13 in cooperation with a pressure tight gland/seal fitting 17. A drive train for shaft 19 is not shown but can be located beyond fitting 17 in any suitable and convenient arrangement desired. Within the cylindrical interior of sidewall 11, shaft 19 carries a two-stage impeller 14, the height of which is almost coextensive with the length of sidewall 11 (except for close top and bottom clearances. Impeller 14 comprises central hub member 16 and joined thereto a different set of agitator blades for each stage of the impeller. Thus, provided in the first (lower) impeller stage are two directly opposed, generally rectangular, matched blades 15 which are joined to hub member 16 at a slightly pitched angle (e.g. about 10°) to the axis of rotation. The blade arrangement for the upper (second) impeller stage consists of three, evenly spaced, generally rectangular, matched blades 23. These three blades are not pitched, but rather are mounted in coaxial alignment with the axis of rotation of shaft 19. Furthermore, the effective radius of the outermost tips of these blades 23 is significantly larger than that of blades 15 in the lower stage. In fact, the clearance between cylindrical sidewall 11 and the tips of blades 23 is preferably less than about one-quarter of an inch, whereas the clearance between sidewall 11 and the tips of blades 15 will generally be at least about 1 inch, (usually more for mixer-reactors having inside diameters of about 12 inches or larger). Wall baffles 18 are elongated ribs or bars of generally rectangular cross-sectional shape which extend vertically along side-wall 11 for substantially the same distance as the height of blades 15 in the lower impeller stage. Said wall baffles 18 have an effective radial dimension equal to about one-eighth of the radius of cylindrical sidewall 11.

The heavy-duty, pressure-sealable mixer/reactor of FIGS. 1 and 2 is well-suited for intensive mixing of a wide variety of thick suspensions or other viscous systems, such as wood pulps or similar fluid suspensions of fine-solids in liquids and/or gases. Indeed, when constructed of suitable corrosion-resistant materials, such embodiments of the present invention can function admirably as highly versatile, well-mixed chemical reactors. For example, they are especially adaptable for carrying out various purification treatments of fine solids, including the bleaching and/or delignification of cellulosic fibers. Of course, for such services, various fittings (not shown in FIGS. 1 and 2) can be provided on housing 12 for use in introducing and/or withdrawing gaseous or liquid reactants, for attaching measuring or sampling devices or even for connecting pulp feeding and/or discharge lines, etc. For example, such fittings could be located at any clear location in the exterior of housing 12, including any or all of side wall 11, floor 13, or even the closure lid (not shown) to be attached to top flange 20. In other words the key features of this invention could also be incorporated in continuous style equipment with many of the same advantages. For example, two or more of the above described double-stage units could be connected in series, or a single housing could be extended in length sufficiently to accommodate a second 2-stage impeller extending through a third section similar to the previously described first section and a fourth section similar to the previously described second section.

Figure 3:
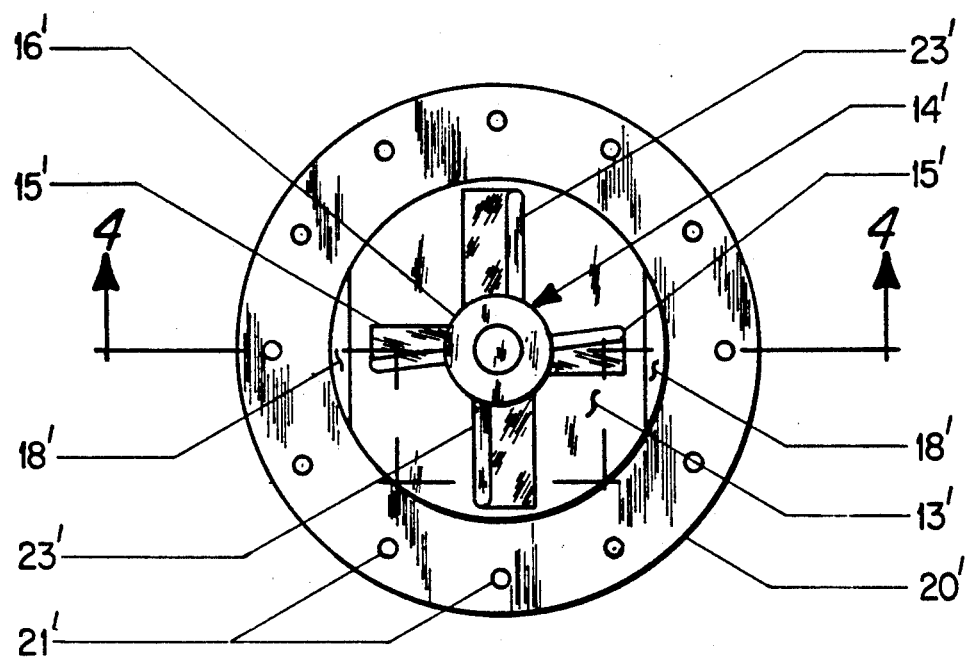
FIG. 3 is a top, plan view of another embodiment of the novel mixer-reactor equipment of this invention depicting alternative combinations and arrangements of wall baffles and two-stage impeller designs.
Figure 4:
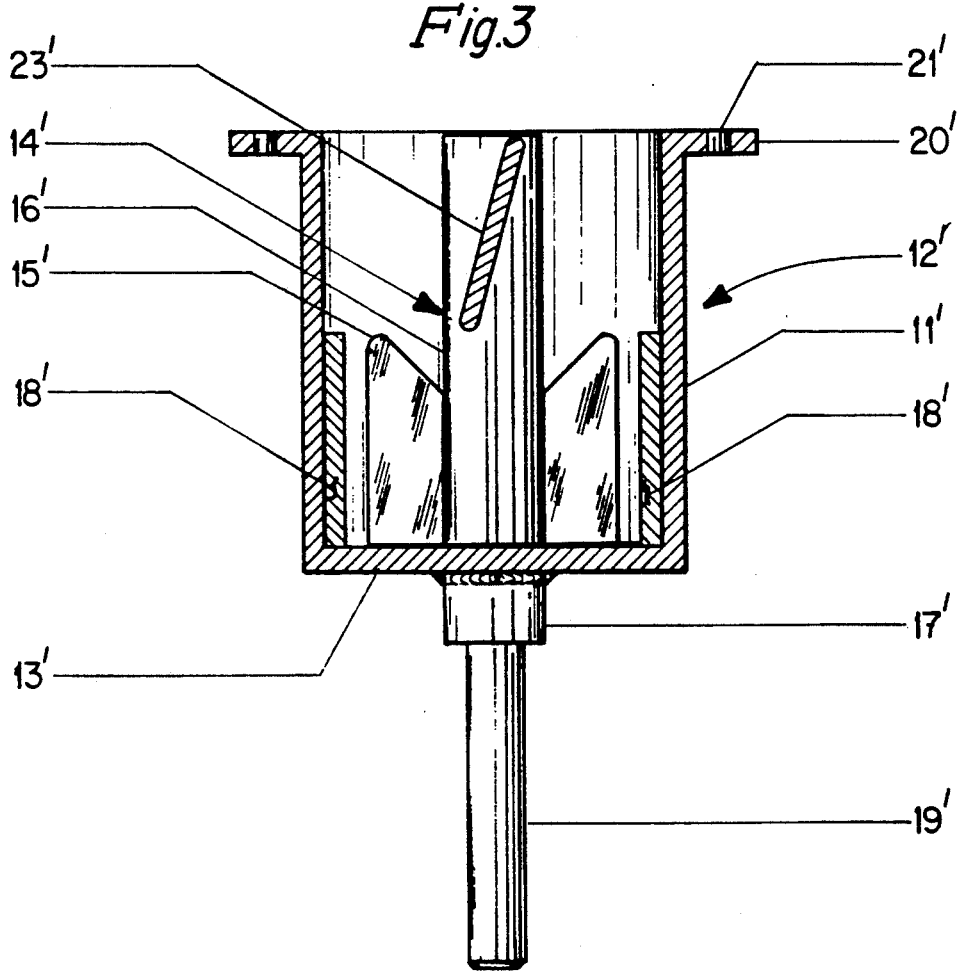
FIG. 4 is an elevational side view of the mixer-reactor of FIG. 3 taken along uneven cross-section line 4—4 thereof.

FIGS. 3 and 4 depict another embodiment of this invention similar to that shown in FIGS. 1 and 2 except for a different baffle system and an alternative arrangement of impeller blades. Therefore, the same set of reference numerals (with an added "prime" mark) are used to designate the corresponding parts of the embodiment of FIGS. 3 and 4.

The alternative features represented in the apparatus of FIGS. 3 and 4 are as follows:

(1) Inside the lower section of cylindrical wall 11', wall baffles 18' having a uniform cross-sectional shape of a geometric segment of a circle substantially equal in diameter to that of said cylindrical wall 11' have been substituted for the two directly opposed elongated ribs 18 in FIGS. 1 and 2.

(2) Blades 15' in the lower section are no longer of regular rectangular shape like blades 15 of FIGS. 1 and 2. Instead, blades 15' have a generally trapezoidal shape such as that obtainable by cutting away a substantial area from the upper, inside part of rectangular blades 15. The specific blades 15' shown in FIGS. 3 and 4 have a sort of wing-tipped shape at the top as though a roughly triangular section were removed from the innermost and uppermost corner position of a full rectangular blade (such as 15). Thus, the outer edges of blades 15' are still substantially coextensive with wall-baffles 18' even though their inner edges (which adjoin central hub member 16') reach only about one half to about two thirds as far.

(3) Upper blades 23' are similar to generally rectangular blades 23 except that blades 23' are mounted on hub member 16' at a small pitched angle (e.g. about 10°) to their axis of rotation, more like the blades 15' and 15 in the lower section of the respective mixer-reactors. The pitch of said upper blades can be varied from about 5° to about 25° in either direction relative to the direction of rotation.

In addition to the alternative structures, including types and combinations of baffles and agitator blades, already pointed out in the specific embodiments described herein above, many other alterations, variations and substitutions within the scope of our invention are possible as will be understood by those skilled in the art. For example, the upper edges of blades 15' remaining after removal of uppermost and innermost corners of full rectangular blades (like blades 15) could be curved (instead of straight), e.g. as though a circular portion were cut away instead of a triangular portion. In fact, still other shapes of cut-away portions could be removed so long as the full outer edge of such blades 15' is retained intact and the size of the section removed is not substantially greater than about 25% of a comparable full-sized rectangular blade (such as blades 15).

Although the floors 13 and 13' of the mixer-reactors shown in FIGS. 1 through 4 are level and flat, other symmetrical, smooth-surfaced shapes are also feasible. For example, concavely or convexly conical or dished end-closures are also suitable provided the shape of the lower edges of blades (such as 15 or 15') is adjusted accordingly so as to maintain the desired close clearance between the floor and said lower edges. These same considerations also apply with regard to the advisability of having conforming shapes for the inner surface of the top end closure and for the top edges of upper stage blades (such as 23 or 23') to be used thereunder.

The advantages of the mixer-reactor apparatus of the present invention are of outstanding value in effecting more thorough chemical treatments (e.g. in bleaching) of wood pulp within short time periods, i.e. generally less than one hour in duration. Thus, even with very high consistency pulps, a uniform mixture thereof with most liquid chemical reagents can be achieved in our apparatus in less than one minute at "high intensity" agitator blade tip speeds (i.e. above about 20 feet/second). Indeed, thorough uniform mixing and reaction can usually be achieved within very few minutes of high intensity mixing in our apparatus with most gaseous chemical reagents, such as chlorine, chlorine dioxide, etc. However, when using gaseous reagents like oxygen and ozone which are only very slightly soluble in aqueous media, it is advisable to operate the mixer-reactor at a substantial superatmospheric pressure, e.g. about 50 psig or more in order to avoid the need for extended mixing times. In fact, since ozone is seldom available at concentrations much greater than about 5% by volume (in a carrier gas such as oxygen), pressures of about 100 psig and higher are often recommended for use in effecting chemical treatments by same.

This invention has been described fully with respect to various specific, practicable and presently preferred embodiments. However, it will be apparent to those of ordinary skill in the art that many equivalent constructions or alternatives can readily be substituted or made without departing from the spirit of our teachings or the definitions contained in the appended claims.

We claim:

1. Mixer-reactor apparatus especially suited for mixing a particulate solid material with a reactive gas comprising a housing having a generally cylindrical inside wall integrally connected at one end to a rigid closure piece and with a suitably sealed drive shaft extending through said closure piece in concentric alignment with said cylindrical inside wall; said cylindrical inside wall having a length to diameter ratio substantially greater than 0.5 with a plurality of uniformly shaped, coaxial, equally spaced, elongated baffles mounted on that portion of said inside wall which is adjacent said closure piece, said portion representing not substantially more than half of the total length of said inside wall and leaving the remainder of said inside wall free of baffles; and mounted on said drive shaft a rotor equipped with a two-stage, multibladed, impeller having a different set of agitator blades within the unbaffled portion of said wall compared to that within the baffled portion thereof characterized in that the outermost radius of the blades in said unbaffled portion is at least 15% larger than that of the blades in said baffled portion and the cumulative vertical height of the blades in said two-stage impeller is substantially coextensive with the full length of said inside wall.

2. Mixer-reactor apparatus as described in claim 1 wherein said cylindrical inside wall has a length to diameter ratio between ⅔ and 4/1 and the length of said unbaffled portion of said inside wall represents at least half but not substantially more than four-fifths its full length.

3. Mixer-reactor apparatus as described in claim 1 wherein the clearance between the outermost edges of the blades within said unbaffled portion and the surrounding inside wall is not substantially more than a quarter of an inch.

4. Mixer-reactor apparatus as described in claim 3 wherein the clearance between the outermost edges of the blades in said baffled portion and the innermost surface of the wall baffles surrounding same is equal to between one-fifth and one-tenth of the radius of said inside wall.

5. Mixer-reactor apparatus as described in claim 4 wherein the maximum radial dimension of said elongated baffles is between one-tenth and one-fifth of the radius of said inside wall and the outermost radius of blades in said unbaffled portion is not substantially less than 20% greater than that of the blades in said baffled portion.

6. Mixer-reactor apparatus as described in claim 5 wherein the maximum radial dimension of blades in said unbaffled portion is between 20% and 40% greater than that of the blades in said baffled portion.

7. Mixer-reactor apparatus as described in claim 1 wherein the blades in said baffled portion are pitched at an angle of more than 5° to the axis of rotation of the rotor.

8. Mixer-reactor apparatus as described in claim 7 wherein the blades in said unbaffled portion are also pitched at an angle of more than about 5° to the axis of rotation of the rotor.

9. Mixer-reactor apparatus as described in claim 8 wherein the direction of pitch of the blades in the unbaffled portion is reversed from that in the baffled portion.

10. Mixer-reactor apparatus as described in claim 1 wherein at least the outermost edges of the blades in each portion extend substantially the full length thereof.

11. A mixer-reactor apparatus particularly useful for affecting mixing and reaction of a particulate solid material with a reactive gas under super-atmospheric pressure comprising a housing enclosing a generally cylindrical inner chamber the sidewall of which has a length-/diameter ratio of at least about 1.0 and is integrally connected at the bottom to a base member and carries means for attaching a removable closure-piece to the top; a suitably sealed drive shaft extending through said base in concentric alignment with said side-wall; a plurality of equally spaced, axially aligned uniform baffles mounted on the inside of the lower part of said side-wall and extending from essentially the bottom thereof up to no more than about the mid-height thereof, leaving the remaining (upper) part thereof unbaffled; each of said baffles having a uniform cross-sectional shape such that the surface thereof adjacent to the sidewall fits against said sidewall and the exposed innermost surface thereof is either substantially flat or only slightly contoured; and mounted on said drive shaft a rotor equipped with a two-stage multi-bladed impeller having a different set of agitator blades within the unbaffled part of said sidewall compared to that in the baffled part thereof, characterized in that the outermost radius of blades in said unbaffled part is at least 20% larger than that of blades in said baffled part and that at least the outermost edges of the blades within each of said parts are substantially coextensive with the full length of the corresponding parts of said side-wall.

12. A mixer-reactor as in claim 11, wherein the number of baffles is not more than four and the maximum thickness of each baffle is between one-twelfth and one-thirtieth of the inside diameter of said side-wall.

13. A mixer-reactor as in claim 12, wherein the number of agitator blades in the baffled part is not more than six and each blade is mounted on said rotor at the same angular pitch, which is at least 5° but not more than 25° relative to the axis of rotation of said rotor.

14. A mixer-reactor as in claim 12 wherein the blades in said baffled part are also pitched at an angle of 5° to 25° relative to the axis of rotation of the rotor.

15. A mixer-reactor as in claim 14 wherein the direction of pitch of the blades in the unbaffled part is reversed from that in the baffled part.

16. A mixer-reactor as in claim 11 wherein the clearance between the outermost edges of the blades in said unbaffled part and the side-wall surrounding same substantially more than a quarter of an inch.

17. A mixer-reactor as in claim 16 wherein the clearance between the outermost edges of the blades in said baffled part and the innermost surface of said baffles therein is equal to between one-fifth and one-tenth of the radius of said side-wall and the outermost radius of blades in said unbaffled part is at least 25% larger than that of the blades in said baffled part.

18. A mixer-reactor as in claim 11 wherein the blades in said unbaffled part have a uniform, generally rectangular shape whereas the blades in said baffled part have roughly trapezoidal outline wherein the height of the inner edges of said blades is substantially less than the height of their outer edges.

19. A mixer-reactor as in claim 18 wherein the height of said inner edges is no more than two-thirds of the height of their outer edges.

20. A mixer-reactor as in claim 11 wherein said baffles have a cross-sectional shape corresponding generally to a geometric segment of a circle the radius of which is substantially the same as that of said side-wall and the rounded face of which fits against said side wall.

* * * * *